United States Patent
Skog et al.

(10) Patent No.: US 9,949,109 B2
(45) Date of Patent: Apr. 17, 2018

(54) METHOD AND ARRANGEMENT FOR CONNECTIVITY IN A COMMUNICATION NETWORK

(71) Applicant: Telefonaktiebolaget L M Ericsson (publ), Stockholm (SE)

(72) Inventors: Robert Skog, Hasselby (SE); Bo Astrom, Stockholm (SE); Tomas Holm, Alvsjo (SE); Lars-Orjan Kling, Sodertalje (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 239 days.

(21) Appl. No.: 14/462,989

(22) Filed: Aug. 19, 2014

(65) Prior Publication Data

US 2014/0357264 A1    Dec. 4, 2014

Related U.S. Application Data

(63) Continuation of application No. 13/070,550, filed on Mar. 24, 2011, now Pat. No. 8,818,361.

(51) Int. Cl.
*H04W 8/02* (2009.01)
*H04W 8/18* (2009.01)
(Continued)

(52) U.S. Cl.
CPC .............. *H04W 8/02* (2013.01); *H04W 8/18* (2013.01); *H04W 8/26* (2013.01); *H04W 8/183* (2013.01); *H04W 48/08* (2013.01)

(58) Field of Classification Search
CPC ..... H04W 84/12; H04W 12/06; H04W 48/20; H04W 60/00; H04W 60/005;
(Continued)

(56) References Cited

U.S. PATENT DOCUMENTS 8,634,836 B2 * 1/2014 Pani et al. .................... 455/440
8,644,178 B1 * 2/2014 Oroskar ........................ 370/252
(Continued)

FOREIGN PATENT DOCUMENTS

WO   2007114657 A1   10/2007

OTHER PUBLICATIONS

Petkovic, M., et al., "Digital Inheritance of Personal and Commercial Content Using DRM", Consumer Communications and Networking Conference, 2007, CCNC 2007-20-07 4th IEEE, IEEE, PI, Jan. 1, 2007, pp. 950-954, XP031087923.
(Continued)

*Primary Examiner* — Liton Miah

(74) *Attorney, Agent, or Firm* — Rothwell, Figg, Ernst & Manbeck, p.c.

(57) ABSTRACT

Method and arrangement for supporting connectivity of a wireless device to a network infrastructure. An infrastructure provider associates a set of device identification numbers to a first radio access provider in a subscription database of the infrastructure provider. The infrastructure provider also sets the first radio access provider as a preferred roaming partner in a SIM that comprises a subscriber identifier with a network identifier of the infrastructure provider. The SIM is provided for use in the device, to enable access to the network infrastructure over a radio access network of the first radio access provider based on the subscriber identifier and the preferred roaming partner in the SIM.

4 Claims, 3 Drawing Sheets

(51) Int. Cl.
*H04W 8/26* (2009.01)
*H04W 48/08* (2009.01)

(58) Field of Classification Search
CPC ......... H04W 36/0022; H04W 36/0027; H04W 36/0066; H04M 15/8038; H04M 2215/34; H04M 2215/7442
See application file for complete search history.

(56) References Cited

U.S. PATENT DOCUMENTS

| | | | | |
|---|---|---|---|---|
| 8,644,259 | B2* | 2/2014 | Somasundaram et al. | 370/332 |
| 8,682,299 | B2* | 3/2014 | Jung et al. | 455/414.1 |
| 8,954,077 | B2* | 2/2015 | Horn | H04W 36/08 370/331 |
| 9,549,389 | B2* | 1/2017 | Nylander | H04W 68/00 |
| 9,572,089 | B2* | 2/2017 | DiGirolamo | H04J 11/0093 |
| 2009/0070694 | A1 | 3/2009 | Ore et al. | |
| 2010/0087225 | A1* | 4/2010 | Nagaraj | H04W 8/22 455/552.1 |
| 2011/0021195 | A1* | 1/2011 | Cormier | H04W 48/18 455/435.2 |
| 2011/0195700 | A1* | 8/2011 | Kukuchka | H04W 8/18 455/422.1 |
| 2011/0223887 | A1* | 9/2011 | Rune | H04L 63/101 455/411 |

OTHER PUBLICATIONS

"OMA DRM v2.0 Extensions for Broadcast Support; OMA-TS-DRM_XBS-V1_0.20080609-C", OMA-TS-DRM_XBS-V1_0.20080609-C Open Mobile Alliance (OMA), 4330 La Jolla Village Dr., Suite 110, San Diego, CA 92122, USA, No. 1.0.8 Jun. 9, 2008 pp. 1-206, XP064032280, Retrieved from the Internet: URL:ftp/Public_documents/BCAST/Permanent_documents/ [retrieved on Jul. 1, 2008].
Park, H., et al., "Copyright Protection for Modifiable Digital Content Based on Distributed Environment", IEICE Transactions on Information and Systems, Information & Systems Society, Tokyo, JP, vol. E91D, No. 5, May 1, 2008, pp. 1390-1397, XP001553531.
Extended European Search Report dated Mar. 31, 2015 in corresponding European application No. 08767199.6, 10 pages.
International Search Report and Written Opinion issued in International application No. PCT/SE2011/050347 dated Dec. 22, 2011, 11 pages.
G. Horn, Qualcomm Inc., 3GPP Femtocells: Architecture and Protocols, , Sep. 2010, http://www.qualcomm.com/documents/files/3gpp-femtocells-architecture-and-protocols.pdf, Sep. 2010, 64 pages.
3rd Generation Partnership Project; Technical Specification Group Core Network and Terminals; Numbering, addressing and identification (Release 10), http://www.3gpp.org/ftp/Specs/archive/23_series/23.003/23003-a00.zip, Dec. 22, 2010, 77 pages.

* cited by examiner

METHOD AND ARRANGEMENT FOR CONNECTIVITY IN A COMMUNICATION NETWORK

CROSS-REFERENCE TO RELATED APPLICATION(S)

This application is a continuation of application Ser. No. 13/070,550, filed on Mar. 24, 2011 (status pending), which published as US-2012/0244858, which patent publication is incorporated by reference herein.

TECHNICAL FIELD

The invention relates generally to a method and arrangement for supporting connectivity of devices in a mobile communications network.

BACKGROUND

In the field of mobile communication, a great range of new communication devices and services have recently been developed and introduced on the market. Consequently, different devices have different capabilities and needs for using services and also require different types of connectivity to communication networks, e.g. depending on requirements related to bandwidth, quality and delays. The communication devices of today include anything from advanced user equipments with many functions and great computer capacity, to very simple so-called "M2M" (Machine-to-Machine) devices e.g. configured to automatically provide status reports or measurements to a central enterprise. In this development, the need for differentiated subscription models has increased to suit such different needs and requirements.

It is also common that multiple network operators are active in the same region operating their own more or less geographically overlapping networks using proprietary equipment, services and functionality, although mostly based on standardised products and protocols. However, some operators may share certain basic equipment such as communication links, power supply, cabinets and antenna towers, in order to reduce their investment and operational costs. Moreover, it has been proposed that multiple radio access networks of different operators can utilize the same infrastructure in terms of core network functions apart from radio access functions, including resources for e.g. switching, control and signalling, links, routers, gateways, processors, subscription databases, as well as nodes for IP (Internet Protocol) connection establishment, policy enforcement, diagnostics, etc. For example, an SS7 signalling network can be employed in the infrastructure to be re-used by all the radio access networks.

Effectively, operators of the radio access networks, which in this description will be referred to as "radio access providers", can hire infrastructure resources according to a range of subscription models from a network infrastructure when providing communication services for their subscribers, without having to invest in such equipment themselves. Further, the term "device" represents any communication entity capable of radio communication over a mobile access network, e.g. mobile telephones, computers, M2M devices, etc.

FIG. 1 illustrates an exemplary scenario where such a shared network infrastructure 100 is used by multiple radio access providers having their radio access networks or "RANs" 102 connected to a GGSN (Gateway GPRS Support Node) of the infrastructure 100. Each RAN 102 may include an SGSN (Serving GPRS Support Node), not shown, configured to route communications to the GGSN of infrastructure 100. In this illustration, an enterprise 104 owns an M2M device "D" which is able to communicate with the enterprise 104, e.g. for automatically sending status or measurement reports thereto, over any of the RANs 102 and the infrastructure 100.

In this arrangement, the infrastructure 100 has disposal of a number of subscriber identifiers normally referred to as IMSI (International Mobile Subscriber Identifier) numbers, which can be provisioned in subscriber modules, e.g. SIM (Subscriber Identity Module) cards, to be installed in the devices for unique identification of the devices when communicating. An IMSI number is normally formed as "MCC+MNC+MSIN", where MCC is a Mobile Country Code of three digits, MNC is a Mobile Network Code of two or three digits, and MSIN is a Mobile Subscriber Identification Number of a maximum of ten digits.

The radio access providers are thus "customers" with the infrastructure and subscriber modules provisioned with IMSI numbers are supplied to the radio access providers associated with subscriptions which are specifically configured for pertain types of devices requiring specific resources in the infrastructure. The subscriptions can thus be "tailor-made" to suit specific types of devices and/or enterprises. The radio access providers are then in turn able to sell such subscriptions and corresponding subscriber modules to their customers, i.e. end-users and enterprises having one or more devices.

However, it has been recognized as a problem that using the given structure of IMSI numbers above, the devices will not always attach to the correct radio access network, e.g. the "home" network, and at the same time be connected to the shared network infrastructure. If the MNC in an IMSI number used by a device identifies the infrastructure, as currently proposed for such shared infrastructures, the device will be directed thereto but may on the other hand attach to any radio access network which may not be the correct one. As a result, the device will effectively roam by attaching to other, or "visited", networks which generates undue costs.

SUMMARY

It is an object of the invention to address at least some of the problems and issues outlined above. It is possible to achieve these objects and others by using a method and an arrangement as defined in the attached independent claims.

According to one aspect, a method is provided in an infrastructure provider for supporting connectivity of a wireless device to a network infrastructure. In this method, the infrastructure provider associates a set of device identification numbers, e.g. MSINs, to a first radio access provider in a subscription database of the infrastructure provider, and sets the first radio access provider as a preferred roaming partner in a subscriber module, e.g. a SIM. A subscriber identifier, e.g. IMSI, in the subscriber module includes at least a network identifier, e.g. MNC, of the infrastructure provider and one of the device identification numbers associated to the first radio access provider. The subscriber module is also provided for use in said wireless device. Thereby, access to the network infrastructure over a radio access network of the first radio access provider is enabled in the wireless device based on the subscriber identifier and the preferred roaming partner in the subscriber module.

According to another aspect, an arrangement is provided in an infrastructure provider configured to support connectivity of wireless devices to a network infrastructure. This infrastructure provider arrangement comprises an associating module adapted to associate a set of device identification numbers to a first radio access provider in a subscription database of the infrastructure provider. The arrangement also comprises a configuring module adapted to set the first radio access provider as a preferred roaming partner in a subscriber module. A subscriber identifier in the subscriber module includes at least a network identifier of the infrastructure provider and one of the device identification numbers associated to the first radio access provider.

The arrangement also comprises a providing module adapted to provide the subscriber module for use in the wireless device. Access to the network infrastructure over a radio access network of the first radio access provider is enabled in the wireless device based on the subscriber identifier and the preferred roaming partner in the subscriber module.

The above method and arrangement may be configured and implemented according to different embodiments. In one possible embodiment, the infrastructure provider enables the wireless device to attach to the first radio access provider according to the preferred roaming partner in the subscriber module, and further enables the first radio access provider to direct the wireless device to the network infrastructure based on the network identifier included in the subscriber identifier in the subscriber module. In another possible embodiment, the infrastructure provider enables the network infrastructure to charge the first radio access provider, or vice versa, for any services used by the device, by mapping the device identification number in the subscriber identifier to the first radio access provider according to the association made in the subscription database. In another possible embodiment, the infrastructure provider enables the network infrastructure to authenticate the device based on the device identification number which has been associated to the first radio access provider in the subscription database and is also included in the subscriber identifier in the subscriber module.

In another embodiment, the infrastructure provider may set the first radio access provider as a preferred roaming partner in the subscriber module and provide the subscriber module to the first radio access provider, in response to a request from the first radio access provider for one or more subscriber modules. Further, at least one of the above actions of associating, setting and provisioning may be executed over the air after the subscriber module has been provided for use in the wireless device.

The preferred roaming partner in the subscriber module may be changed over the air by setting a second radio access provider as the preferred roaming partner, in which case the infrastructure provider also associates the device identification number in the subscriber identifier to the second radio access provider in the subscription database. Thereby, the first radio access provider can be replaced by the second radio access provider for that device in a neat manner.

It is further possible that the infrastructure provider associates different sets of device identification numbers to different radio access providers in the subscription database, and sets the different radio access providers as preferred roaming partners in further subscriber modules. In that case, subscriber identifiers in said further subscriber modules include the network identifier, to enable access to the infrastructure over corresponding radio access networks by means of those subscriber modules.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
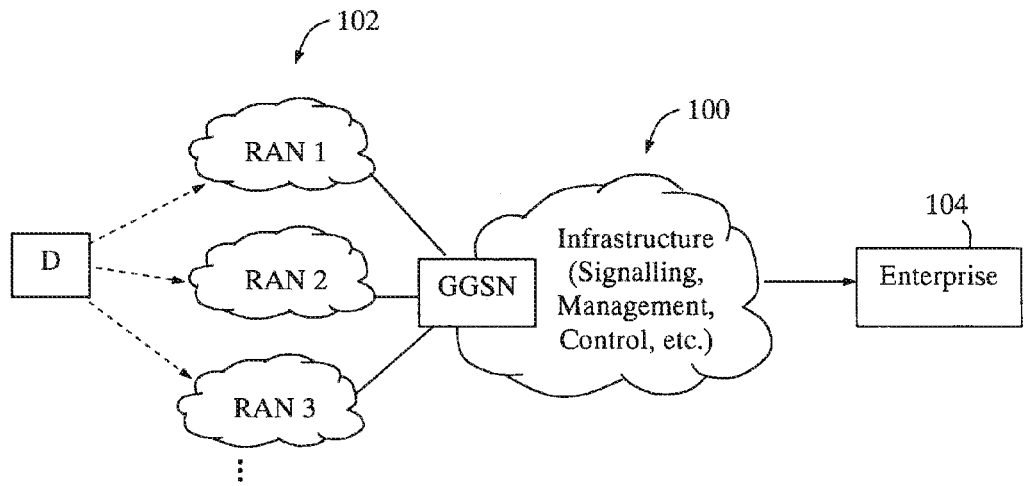
FIG. 1 is an overview of how a shared infrastructure can be used, according to the prior art.

Briefly described, the invention can be used to support connectivity for devices to a shared network infrastructure without generating undue costs associated with roaming to a visited radio access network. This solution can be implemented and realised in an entity called "infrastructure provider" in the following, which could be a server or any kind of suitable control node associated with the network infrastructure, e.g. distributed over more than one physical node or entity, and the invention is not limited in this respect.

By dividing a range of device identification numbers, e.g. MSINs, into different sets, e.g. intervals, which are assigned or associated exclusively to different radio access providers, i.e. network operators, those device identification numbers can be used to identify the proper radio access provider of a device when the device uses a subscriber module, e.g. SIM, provisioned with one of the corresponding set of device identification numbers. For example, a range of MSINs 000-299 may be assigned to a first radio access provider, while another range of MSINs 300-499 may be assigned to a second radio access provider, and so forth. Here, the "proper" radio access provider is thus the one having sold or otherwise provided a subscription with the subscriber module to the owner or controller of the device, e.g. a person, company, corporation, enterprise, organization or the like. In the following, the term "device owner" is used to represent any of the above examples or any other party that controls a device using a subscriber module according to this solution.

Further, by setting the proper radio access provider of a subscriber in an existing parameter of the subscriber module called "preferred roaming partner", the device will accordingly try to attach to the access network of that radio access provider, whenever possible in terms of radio coverage, instead of attaching to any visited network, thereby avoiding roaming and associated costs. The device identification number, e.g. MSIN, is included in a subscriber identifier, e.g. IMSI, which is provisioned in the subscriber module. The subscriber identifier also includes a network identifier, e.g. MNC, of the infrastructure provider such that the device will accordingly be directed by the access network further to the infrastructure as desired to utilise resources therein.

By also associating the device identification number of the device to that radio access provider in a subscription database, e.g. HLR, of the infrastructure, the device can be authenticated by the infrastructure to allow its services for the device. The proper radio access provider may also be charged by the infrastructure for any services used by the device, as the device identification number in the subscriber identifier can be mapped to that radio access provider in the subscription database. On the other hand, The infrastructure may be charged by the radio access provider for resources used by the device in the radio access network, and payments for used resources may go in either direction depending on what agreement is employed between the infrastructure the radio access provider.

Among other things, an additional advantage with this solution is that the home access network of the device can be changed quite easily by changing the preferred roaming partner in the subscriber module over the air and associating the device identification number to the new radio access provider in the subscription database. The device will accordingly try to attach to the new access network of that radio access provider who may also be charged by the infrastructure, or vice versa, for any services and resources used by the device according to the changed association in the subscription database.

By this inventive configuration of the subscriber module, the device will attach to the correct radio access network whenever possible, and at the same time be directed to the shared network infrastructure to be served with any needed network resources therein. Any unnecessary roaming costs can be avoided while radio access providers can supply a range of different subscription models for their customers by utilising the shared network infrastructure without having to invest in the needed equipment themselves. The infrastructure provider is used to basically configure subscriber modules in the above manner, which will be described further in the following.

In this description, a subscriber module may be any of: a physical SIM (Subscriber Identity Module) card or other module defined by software and/or hardware such as soft SIM, USIM (UMTS SIM), ISIM (IMS SIM), VSIM (Virtual SIM), MCIM (Machine Communication Identity Module), or smart card adapted for installation in the device. Corresponding subscriber data is provisioned and maintained in a subscription database of the network infrastructure, e.g. an HLR or similar. Although it is common to use physical SIM cards in mobile terminals, this solution is not limited thereto.

Figure 2:
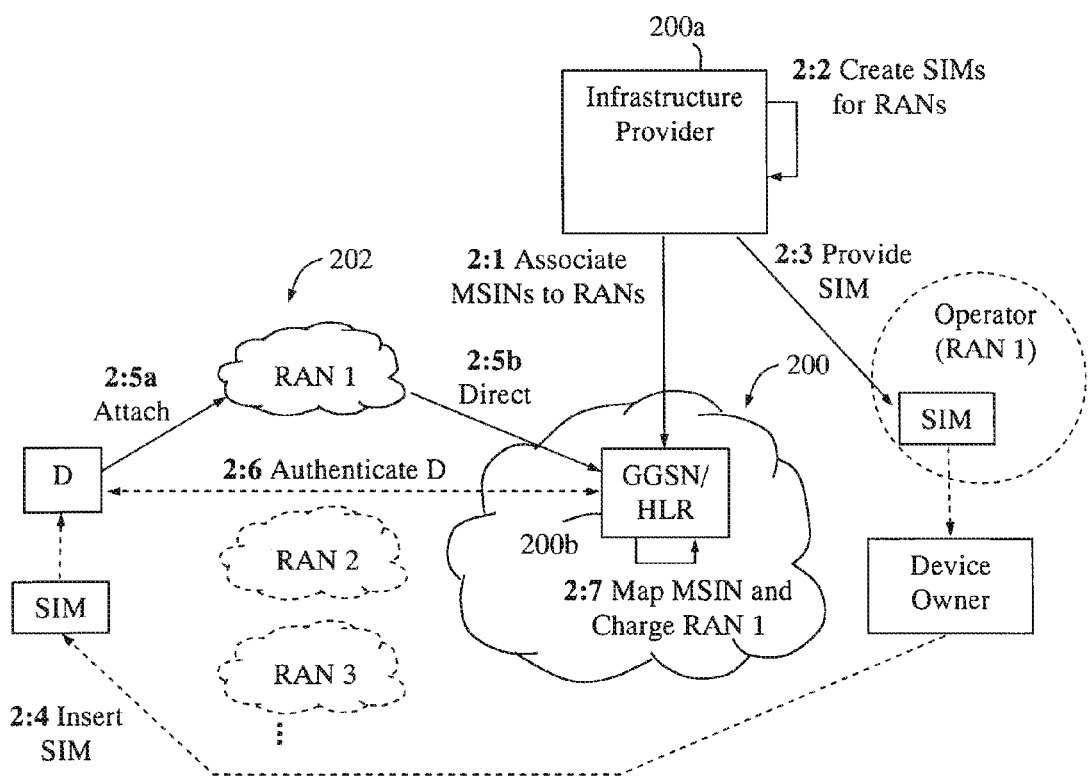
FIG. 2 is a block diagram illustrating a communication scenario where an infrastructure provider is used for supporting connectivity of a wireless device, according to some possible embodiments.

With reference to a communication scenario illustrated in FIG. 2, an example of how connectivity can be supported for a wireless device D to a network infrastructure 200 in accordance with this solution, will now be described. The device D may be an M2M device that is configured to send status reports or measurements to a central enterprise using the device for surveillance or the like, although the following description could just as well be applied for any other type of device and device owner. This solution is basically realised by means of an infrastructure provider 200a associated with the network infrastructure 200, as follows. Although illustrated as a node outside infrastructure 200 for clarity, the infrastructure provider 200a can in practice be implemented as being part of the infrastructure 200, and the invention is not limited in this respect.

In this example, the network infrastructure 200 is shared by at least three providers of radio access networks 202, indicated as RAN 1, RAN 2 and RAN 3 in the figure. The network infrastructure 200 may have various network functions and resources to be hired by the radio access providers, e.g. as exemplified in the background above, in this case including schematically illustrated GGSN/HLR functions 200b for handling communications to and from subscribers in the radio access networks 202, the HLR thus being the subscription database in this context. In practice, the GGSN and HLR functions may be implemented in two separate nodes or in the same node.

Further, the infrastructure provider 200a has disposal of a plurality of subscriber identifiers, typically IMSIs with a range of MSIN numbers, e.g. MSIN000-MSIN999, which can be associated to individual subscribers in the HLR 200b. In this solution, the device identification numbers MSIN000-MSIN999 are divided into distinct sets, e.g. intervals, which are assigned and associated exclusively to different radio access providers and their networks 202, in order to mark which radio access provider a subscriber belongs to. Accordingly, a first shown action 2:1 illustrates that infrastructure provider 200a associates the different sets of MSINs to RAN 1, RAN 2 and RAN 3, respectively, in HLR 200b. For example, MSIN000-MSIN099 may be associated to RAN 1, MSIN100-MSIN199 may be associated to RAN 2, MSIN200-MSIN299 may be associated to RAN 3, and so forth.

In a further action 2:2, infrastructure provider 200a creates or configures subscriber modules SIMs for the different radio access providers and their networks 202. This action may be initiated by requests or the like, not shown, from the individual radio access providers or performed anyway as a preparation procedure, depending on the implementation. This action includes setting the respective radio access providers as a preferred roaming partner in the SIMs, to cause a device using the SIM to attach to the proper RAN according to the preferred roaming partner parameter in the SIM, which is customary for such devices.

This action 2:2 may also include configuring the subscriber identifiers IMSIs disposed by infrastructure provider 200a in the SIMs, such that the IMSIs include a network identifier MNC of the infrastructure provider 200a, to cause the access providers of networks 202 to direct any device using the SIM to the network infrastructure 200 based on the MNC in the IMSI, which is customary for such access providers. Alternatively, the IMSIs may already have been configured in the SIMs and can be used in the manner described here. The MNC thus identifies the network infrastructure 200 and thereby the infrastructure provider 200a. A device identification number MSIN is also included in the subscriber identifiers IMSIs which the infrastructure can use for charging the correct radio access provider, or vice versa, for any services or resources in the infrastructure 200 or radio access network, respectively, used by the device. Action 2:2 basically concludes a "configuration phase" of this solution. It should be noted that actions 2:1 and 2:2 are basically independent of one another and may be executed in any order or at the same time.

The infrastructure provider 200a also provides the created SIMs for use in wireless devices to enable access to the network infrastructure 200 over a proper radio access network 202, to which the respective devices belong, based on the IMSI and the preferred roaming partner in each SIM. A next action 2:3 thus illustrates that a SIM, created for RAN 1 in this example according to the above, is provided to the operator (i.e. access provider) of RAN 1. The operator then offers the SIM to the owner of device D, e.g. when selling and establishing a subscription for the device owner, and the latter is then able to insert the SIM into his device D, shown by a following action 2:4.

In this example, the SIM is configured first and then delivered for use to the operator of RAN 1. However, it is also possible to provide the SIM with a preset IMSI and then when it has been inserted into the device the SIM can be configured remotely "over the air" by means of suitable radio messages from the infrastructure provider 200*a* to the device D. For example, the infrastructure provider 200*a* may use an IMSI in the SIM with a particular MSIN, and then associate that MSIN to a fitting RAN in the HLR 200*b* at any time. In other words, one or more of the above-described actions of associating an MSIN to a RAN in the HLR, setting the RAN as a preferred roaming partner in the SIM, and configuring the IMSI with the MNC and MSIN in the SIM, if not already done, may be executed over the air after the SIM has been provided for use in the wireless device.

When device D is activated with the SIM inserted, it will attempt to attach to RAN 1 according to the preferred roaming partner in the SIM, in an action 2:5a, which is of course the proper network of device D. This way, the preferred roaming partner parameter in the SIM is utilized to cause device D to attach to its own network, RAN 1 in this example, while RAN 1 is actually the "home" network and not a visited or roamed network. In turn, RAN 1 receiving the attach communication from device D will direct the device to the infrastructure 200 according to the MNC in the IMSI of the SIM, in a further action 2:5b. Thus, the network identifier MNC in the IMSI is utilized to cause the attached access network RAN 1 to direct device D to the network infrastructure 200, in this example to the GGSN/HLR node 200*b*.

Next, the GGSN/HLR node 200*b* may authenticate the device D, illustrated schematically by a two-way dashed arrow of action 2:6, based on the IMSI configured in the SIM of the device and further based on the MSIN association in the HLR 200*b*. Device D can now execute communications over the attached RAN 1 and using network resources and services in the network infrastructure 200. A next and final action 2:7 illustrates that the GGSN/HLR node 200*b* charges RAN 1 in this example, for any services and resources in the network infrastructure 200 used by the device D, by mapping the MSIN in the IMSI of device D to RAN 1 according to the association made in the HLR in action 2.1.

If the user of device D wants to change home network at some point, for whatever reason, this can be accomplished without exchanging the SIM for a new one, and even without removing it from the device. The preferred roaming partner in the SIM can be changed over the air by setting a new radio access provider, e.g. RAN 2, as the preferred roaming partner, and the MSIN in the IMSI may also be associated to the new radio access provider RAN 2 in the HLR. As a result, the device will attach to the network of RAN 2 according to the preferred roaming partner parameter in the SIM and the infrastructure 200 will charge RAN 2 for services and resource usage by mapping the MSIN in the IMSI to RAN 2 according to the new association in the HLR. As mentioned above, the radio access provider may charge the infrastructure instead, depending on the agreement employed.

An example of how a subscriber module can be configured to accomplish connectivity of a wireless device to a network infrastructure shared by multiple radio access providers, will now be described with reference to FIG. 3. In this case, the subscriber module is a SIM 300 for insertion into the wireless device, e.g. as of action 2:4 above, and the SIM 300 can be used in the manner described for FIG. 2 above. To avoid roaming to a visited radio access network and extra costs associated therewith, the SIM 300 is configured with a preferred roaming partner "RAN 1" pointing to the radio access network to which the device belongs by subscription or similar. Thereby, the device will attach to its home network according to this parameter, e.g. as of action 2:5a above, if possible due to radio coverage among other things.

The SIM 300 is also configured with an IMSI which includes an MCC, an MNC and an MSIN according to the conventional IMSI structure. The MCC may be used in a conventional manner which is outside the scope of this solution. However, the MNC, which conventionally points to a home radio access network, in this case points to the network infrastructure "IS" instead. Thereby, the device will be directed by the attached network to the IS, e.g. as of action 2:5b above. The MSIN is one of a set of MSINs that have been associated with RAN 1 in the subscription database (HLR) of the infrastructure provider, and thus points to the proper or home radio access provider of the device. Thereby, the infrastructure can map the MSIN to RAN 1 and charge RAN 1 for services or resources used by the device, e.g. as of action 2:7 above.

Figure 4:
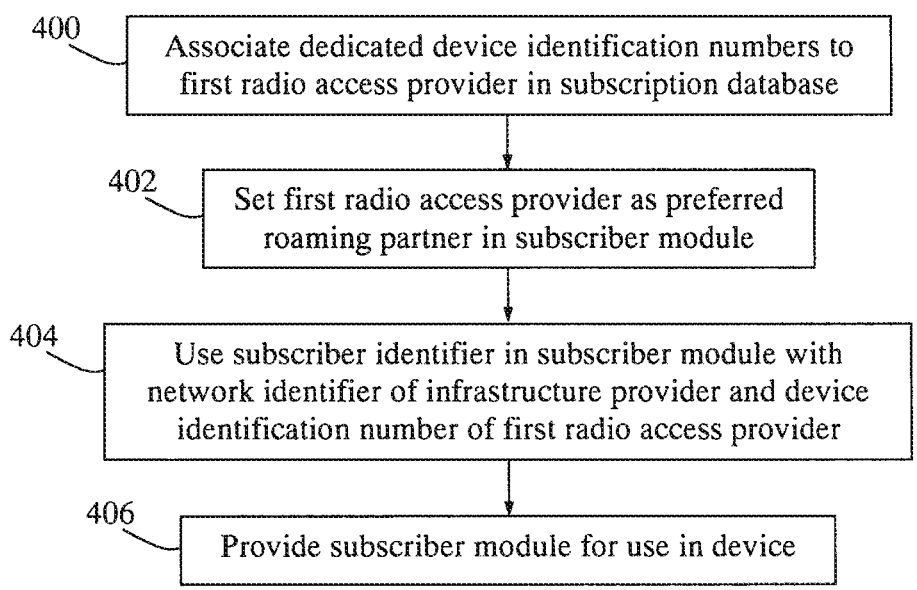
FIG. 4 is a flow chart with actions performed by an infrastructure provider, according to another possible embodiment.

A procedure for supporting connectivity of a wireless device to a shared network infrastructure will now be described with reference to FIG. 4. This procedure includes various actions that may be executed by an infrastructure provider such as the infrastructure provider 200*a* in FIG. 2. This example refers to a "first" radio access provider, which could be any of a plurality of radio access providers sharing the network infrastructure in question, such as any of RAN 1, RAN 2 and RAN 3 in the above example. It should be noted that the actions in FIG. 4 may be executed in any order depending on the implementation, e.g. as described above for the preceding example of FIG. 2.

In a first shown action 400, the infrastructure provider associates a set of device identification numbers, e.g. MSINs, to a first radio access provider in a subscription database, e.g. HLR, of the infrastructure provider. Differently expressed, a mapping is created in the subscription database between the set of device identification numbers, to the first radio access provider. Corresponding associations or mappings may also be created between other sets of device identification numbers to different radio access providers sharing the network infrastructure.

Figure 3:
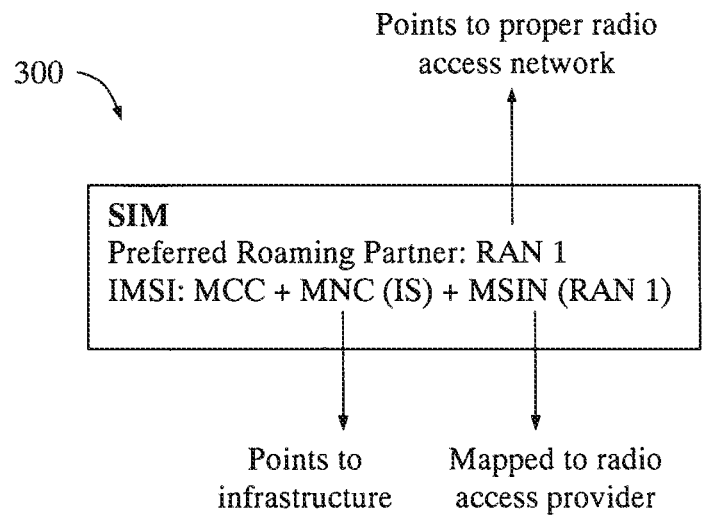
FIG. 3 is a schematic illustration of a subscriber module, according to a possible embodiment.

The infrastructure provider further creates or configures subscriber modules for different radio access providers, basically according to the configuration shown in FIG. 3. In a further action 402, the infrastructure provider sets the first radio access provider as a preferred roaming partner in a subscriber module, e.g. SIM. In a further action 404, the infrastructure provider uses a subscriber identifier, e.g. IMSI, in said subscriber module wherein the subscriber identifier includes at least a network identifier, e.g. MNC, of the infrastructure provider. The subscriber identifier further includes one of the device identification numbers associated to the first radio access provider.

The infrastructure provider finally provides the subscriber module for use in the wireless device, in a last shown action 406. Thereby, the wireless device is able to access the network infrastructure over a radio access network of the first radio access provider based on the subscriber identifier and the preferred roaming partner in the subscriber module, see also the above description of actions 2:5a, 2:5b and 2:6.

The above procedure may be adapted or modified in different ways depending on the implementation, apart from changing the order of execution. For example, the first radio access provider may be set as a preferred roaming partner in the subscriber module and the subscriber module may be provided to the first radio access provider, once a request for one or more subscriber modules is received from the first radio access provider. Further, the network infrastructure is able to authenticate the device for communication based on the device identification number that was included in the subscriber identifier in the subscriber module as of action 404, which has also been associated to the first radio access provider in the subscription database as of action 400.

Figure 5:
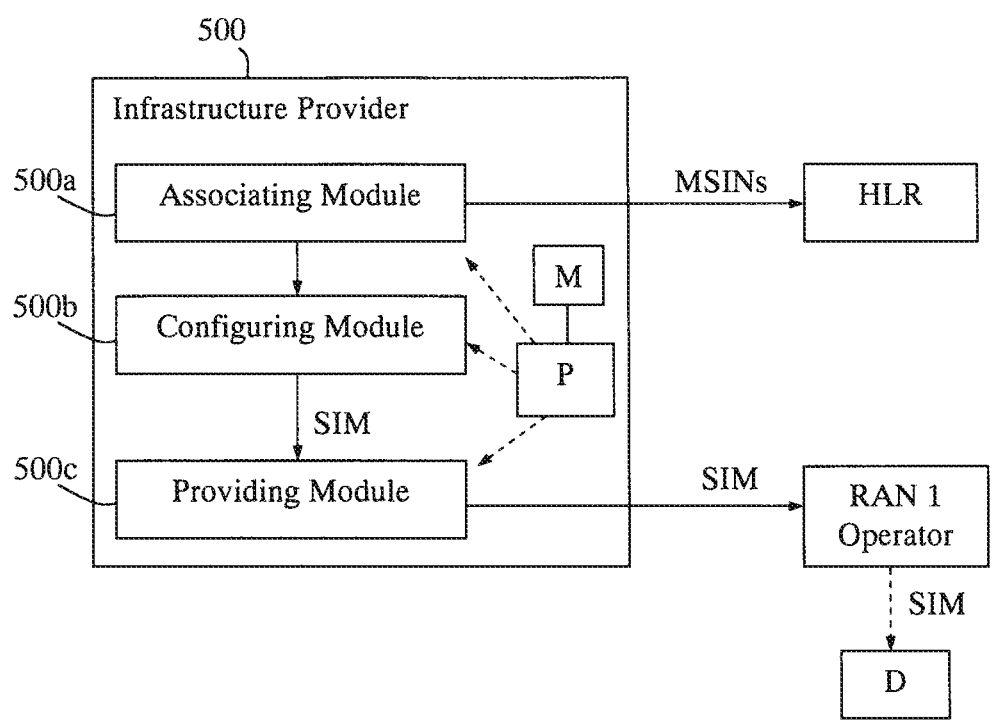
FIG. 5 is a block diagram illustrating an exemplifying infrastructure provider in more detail, according to further possible embodiments.

A more detailed but non-limiting example of how an arrangement can be implemented in an infrastructure provider to accomplish the above-described solution, is illustrated by the block diagram in FIG. 5. The infrastructure provider 500 is thus configured to support connectivity of a wireless device D to a network infrastructure, e.g. in the manner described above for any of FIGS. 2-4.

According to this arrangement, the infrastructure provider 500 comprises an associating module 500a adapted to associate a set of device identification numbers "MSINs" to a first radio access provider "RAN 1" in a subscription database "HLR" of the infrastructure provider. The infrastructure provider 500 further comprises a configuring module 500b adapted to set the first radio access provider as a preferred roaming partner in a subscriber module "SIM", wherein a subscriber identifier "IMSI" is included in the subscriber module SIM. The subscriber identifier is configured to include at least a network identifier of the infrastructure provider and one of the device identification numbers associated to the first radio access provider. The infrastructure provider 500 also comprises a providing module 500c adapted to provide the subscriber module SIM, e.g. to an operator or the like, for use in the wireless device D. Thereby, access to the network infrastructure over a radio access network of the first radio access provider is enabled in the wireless device based on the subscriber identifier and the preferred roaming partner in the subscriber module SIM.

It should be noted that FIG. 5 merely illustrates various functional modules or units in the infrastructure provider 500 in a logical sense, although the skilled person is free to implement these functions in practice using suitable software and hardware means. Thus, this aspect of the solution is generally not limited to the shown structures of the infrastructure provider 500, while its functional modules 500a-500c may be configured to operate according to the features described for any of FIGS. 2-4 above, where appropriate.

The functional modules 500a-500c described above can be implemented in the infrastructure provider 500 as program modules of a computer program comprising code means which, when run by a processor "P" in the infrastructure provider 500, causes the infrastructure provider 500 to perform the above-described functions and actions. The processor P may be a single CPU (Central processing unit), or could comprise two or more processing units. For example, the processor P may include general purpose microprocessors, instruction set processors and/or related chips sets and/or special purpose microprocessors such as ASICs (Application Specific Integrated Circuit). The processor P may also comprise a storage for caching purposes.

The computer program may be carried by a computer program product in the infrastructure provider 500 in the form of a memory "M" connected to the processor P. The computer program product or memory M comprises a computer readable medium on which the computer program is stored. For example, the memory M may be a flash memory, a RAM (Random-access memory), a ROM (Read-Only Memory) or an EEPROM (Electrically Erasable Programmable ROM), and the program modules could in alternative embodiments be distributed on different computer program products in the form of memories within the infrastructure provider 500.

The above infrastructure provider 500 and functional modules 500a-500c may be configured or adapted to operate according to various optional embodiments. For example, the configuring module 500b and the providing module 500c may be further adapted to set the first radio access provider as a preferred roaming partner in the SIM and provide the SIM to the first radio access provider, respectively, in response to a request from the first radio access provider for one or more subscriber modules.

The infrastructure provider 500 may also be configured to execute at least one of the actions of associating, setting and provisioning over the air after the SIM has been provided for use in the wireless device. If the device user wants to change radio access provider, the configuring module 500b may be further adapted to change the preferred roaming partner in the SIM over the air by setting a second radio access provider as the preferred roaming partner. In addition, the associating module 500a may in this case also be adapted to associate the MSIN in the IMSI to the second radio access provider in the subscription database HLR.

In another possible embodiment, the associating module 500a may be further adapted to associate different sets of device identification numbers MSINs to different radio access providers in the subscription database. HLR, while the configuring module 500b may be further adapted to set the different radio access providers as preferred roaming partners and provision subscriber identifiers with the above network identifier MNC in further SIMs, to enable access to the infrastructure over corresponding radio access networks by means of said further subscriber modules.

While the invention has been described with reference to specific exemplary embodiments, the description is generally only intended to illustrate the inventive concept and should not be taken as limiting the scope of the invention. For example, the terms "network infrastructure", "infrastructure provider", "radio access provider", "subscriber identifier" and "network identifier" have been used throughout this description, although any other corresponding nodes, functions, and/or parameters could also be used having the features and characteristics described here. The invention is defined by the appended claims.

The invention claimed is:

1. A method performed by a user entity (UE) having a subscriber module, the method comprising:
   detecting that two or more radio access networks are available to be used by the UE to access a network;
   accessing a subscriber module to obtain a preferred roaming partner identifier stored in the subscriber module, said preferred roaming partner identifier identifying a preferred roaming partner, wherein the subscriber module further stores a subscriber identity comprising: (1) a network operator identifier identifying an infrastructure provider, the network operator identifier comprising a mobile country code (CC) identifier identifying a country and a mobile network code (MNC) and (2) a mobile subscription identification number (MSIN) assigned by the identified infrastructure provider to the preferred roaming partner, said MSIN being a subscriber identifier for identifying a particular subscriber, wherein the preferred roaming partner is a customer of the infrastructure provider and is a network operator that operates at least one of said two or more radio access networks;

determining whether at least one of the two or more available radio access networks is associated with the preferred roaming partner identified by the preferred roaming partner identifier, wherein the preferred roaming partner identifier stored in the subscriber module is different than the network operator identifier stored in the subscriber module; and in response to determining that at least one of the two or more radio access networks is associated with the preferred roaming partner, connecting to said at least one radio access network that is associated with the preferred roaming partner.

2. The method of claim 1, wherein the preferred roaming partner identifier comprises a radio access network (RAN) identifier identifying a RAN.

3. The method of claim 1, wherein the MSIN is included in a set of two or more MSINs, wherein said set of two or more MSINs is assigned by the identified infrastructure provider to the preferred roaming partner that operates at least one of said two or more radio access networks.

4. The method of claim 1, wherein the MSIN is included in a set of at least one-hundred consecutive MSINs, wherein said set of at least one-hundred consecutive MSINs is assigned by the identified infrastructure provider to the preferred roaming partner that operates at least one of said two or more radio access networks.

* * * * *